(12) United States Patent
Kinoshita et al.

(10) Patent No.: US 10,208,730 B2
(45) Date of Patent: Feb. 19, 2019

(54) IGNITION DEVICE FOR INTERNAL COMBUSTION ENGINE

(71) Applicant: KABUSHIKI KAISHA TOYOTA CHUO KENKYUSHO, Nagakute-shi, Aichi-ken (JP)

(72) Inventors: Masao Kinoshita, Nagakute (JP); Takayuki Fuyuto, Nagakute (JP); Ryou Masuda, Nagakute (JP); Yoshihiro Hotta, Nagakute (JP)

(73) Assignee: KABUSHIKI KAISHA TOYOTA CHUO KENKYUSHO, Nagakute-shi (JP)

(*) Notice: Subject to any disclaimer, the term of this patent is extended or adjusted under 35 U.S.C. 154(b) by 0 days.

(21) Appl. No.: 15/804,563

(22) Filed: Nov. 6, 2017

(65) Prior Publication Data
US 2018/0128233 A1    May 10, 2018

(30) Foreign Application Priority Data

Nov. 4, 2016 (JP) .................. 2016-216204

(51) Int. Cl.
*F02P 9/00* (2006.01)
*F02P 1/00* (2006.01)

(52) U.S. Cl.
CPC ........... *F02P 1/005* (2013.01); *F02P 9/00* (2013.01); *F02P 9/002* (2013.01)

(58) Field of Classification Search
CPC .. F02P 9/002; F02P 9/007; F02P 13/00; F02P 15/00; F02P 9/00
USPC ....................................... 123/169
See application file for complete search history.

(56) References Cited

U.S. PATENT DOCUMENTS

| 4,213,428 A * | 7/1980 | Bradley .................. F02B 75/04 123/1 A |
| 5,076,223 A | 12/1991 | Harden et al. |
| 5,211,142 A | 5/1993 | Matthews et al. |
| 5,619,959 A * | 4/1997 | Tozzi ....................... H01T 13/50 123/143 B |
| 7,948,158 B2 * | 5/2011 | Kato ....................... H01T 13/50 123/169 EL |

(Continued)

FOREIGN PATENT DOCUMENTS

| JP | H05-508731 A | 12/1993 |
| JP | 2010-203295 A | 9/2010 |
| WO | 91/15677 A1 | 10/1991 |

*Primary Examiner* — Thomas Moulis
(74) *Attorney, Agent, or Firm* — Oliff PLC (57) ABSTRACT

An ignition device for an internal combustion engine is provided which improves ignition while reducing electric power consumption. An ignition device for an internal combustion engine includes an ignition plug that is placed with a tip exposed on an end in an axial direction of a combustion chamber formed in a cylinder and that includes a central electrode and a grounding electrode provided opposing each other at the tip, and a magnetic field former that forms a magnetic field in a direction in which a magnetic field vector substantially vertically passes through an approximate two-dimensional plane including a spark discharge path formed, by a gas flow ejected to the end in the axial direction of the combustion chamber, between the central electrode and the grounding electrode, and extending in an approximate U shape in a direction orthogonal to the opposing direction of the electrodes.

16 Claims, 10 Drawing Sheets

A-A CROSS SECTION (56) References Cited

U.S. PATENT DOCUMENTS

| | | | | |
|---|---|---|---|---|
| 8,036,808 B2* | 10/2011 | Mori | ............... | H01T 13/40 123/169 EA |
| 9,920,737 B2* | 3/2018 | Ikeda | ............... | F02B 23/08 |
| 2002/0185096 A1* | 12/2002 | Whealton | ............... | H01T 13/40 123/143 B |
| 2009/0050122 A1* | 2/2009 | Storm | ............... | F02B 23/0654 123/604 |
| 2010/0288214 A1* | 11/2010 | Pelmear | ............... | F02B 77/14 123/41.86 |
| 2011/0030660 A1* | 2/2011 | Ikeda | ............... | F02B 1/02 123/536 |
| 2011/0031886 A1* | 2/2011 | Ikeda | ............... | F01L 3/02 315/111.21 |
| 2017/0268418 A1* | 9/2017 | Gamble | ............... | F02B 65/00 |

* cited by examiner

FIG. 1A

A-A CROSS SECTION

FIG. 1B

C-C CROSS SECTION

MAXIMUM ELONGATION DISTANCE

LORENTZ FORCE ACTING ON CONDUCTOR

IGNITION DEVICE FOR INTERNAL COMBUSTION ENGINE

CROSS REFERENCE TO RELATED APPLICATION

The entire disclosure of Japanese Patent Application No. 2016-216204 filed on Nov. 4, 2016, including the specification, claims, drawings, and abstract, is incorporated herein by reference in its entirety.

TECHNICAL FIELD

The present disclosure relates to an ignition device for an internal combustion engine.

BACKGROUND

Figure 14:
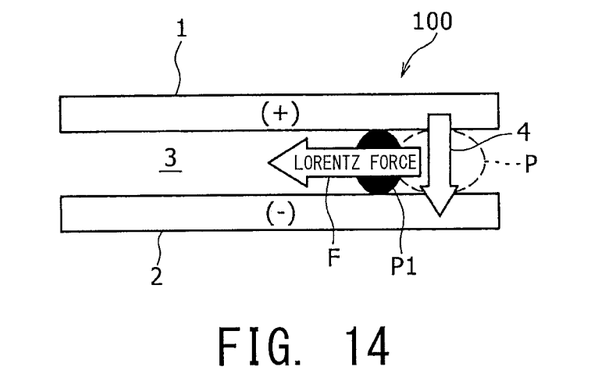
FIG. 14 is a diagram showing an example of a rail plug of the related art.
Figure 15:
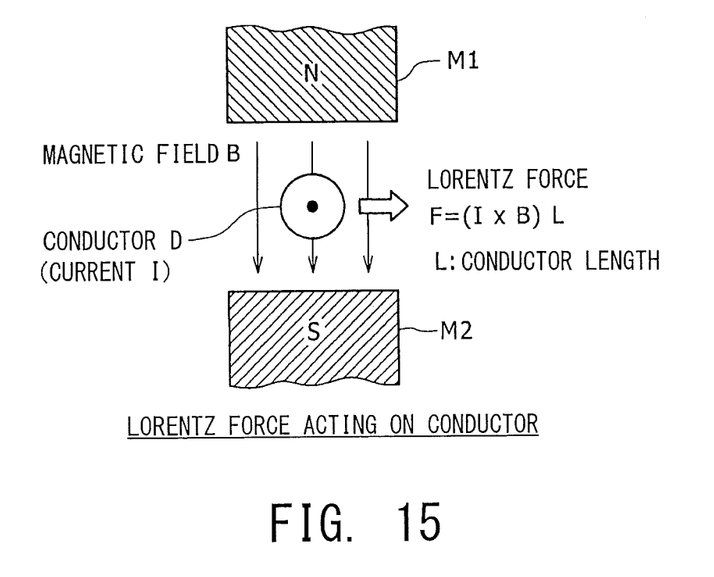
FIG. 15 is a diagram for explaining a principle of action of Lorentz force on a conductor when a current flows in the conductor placed in a magnetic field.

In the related art, a rail plug is known in which the principle of a rail gun is utilized to move plasma (or a spark discharge) by a Lorentz force into a combustion chamber, to thereby improve ignition in the combustion chamber. FIGS. 14 and 15 are diagrams showing such a rail plug 100. As shown in FIG. 14, the rail plug 100 comprises two electrodes 1 and 2 which are placed in parallel to each other with a gap 3 therebetween. Here, an example configuration is shown in which the electrode 1 is an anode and the electrode 2 is a cathode.

A voltage is applied between the two electrodes 1 and 2, to generate plasma P in the gap 3 between the electrodes 1 and 2. A discharge path 4 in which a current flows from the electrode 1 to the electrode 2 is formed by the plasma P. A Lorentz force F acts on the discharge path 4 due to the current flowing therein. FIG. 15 shows the principle of action of the Lorentz force F when a current flows in a conductor. As shown in FIG. 15, a magnetic field B is formed between a magnet M1 having a polarity of N and a magnet M2 having a polarity of S and placed opposing the magnet M1, and a direction of a magnetic field vector in the magnetic field B is from the magnet M1 to the magnet M2. Here, a direction of the current flow, a direction of the magnetic field, and a direction of the Lorentz force are in an orthogonal relationship with each other.

When a current I flows from a deeper side of the page of FIG. 15 toward the front side in a conductor D placed in the magnetic field B, according to Fleming's left-hand rule, a Lorenz force F directed to the right side in FIG. 15 acts on the conductor D. The Lorentz force F in this case is represented by $F=(I \times B)L$, Here, L represents a length of the conductor D in the magnetic field B.

Referring back to FIG. 14, by causing such Lorentz force F to act on the plasma P generated between the electrodes 1 and 2, it is possible to set the plasma P as a shell P1 and to move the shell P1 from the gap 3 between the electrodes 1 and 2 into the combustion chamber, to thereby improve ignition in the combustion chamber.

JP 2010-203295 A discloses a technique in which a direction of plasma ejected into the combustion chamber is changed by the Lorentz force, to avoid concentrated use of particular positions of a central electrode and a grounding electrode for in-gas discharge, to thereby prevent rapid wear of the electrodes.

Figure 16A:
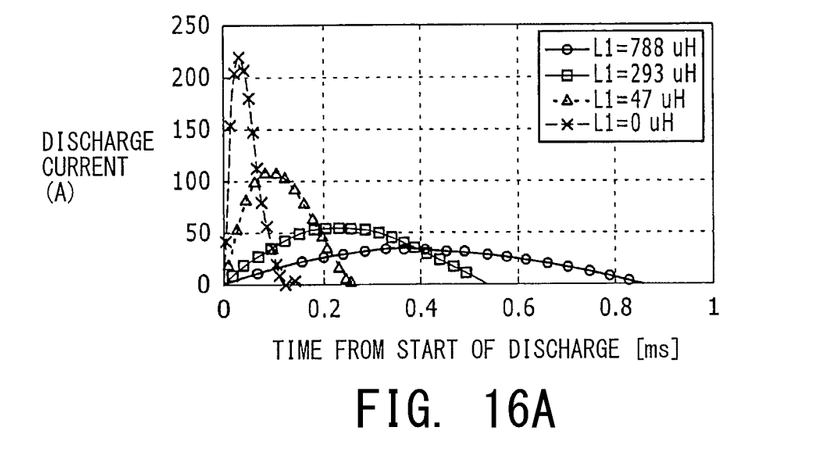
FIG. 16A is a graph showing a relationship between a time from start of discharge (ms) and a discharge current (A) in the rail plug shown in FIG. 14.
Figure 16B:
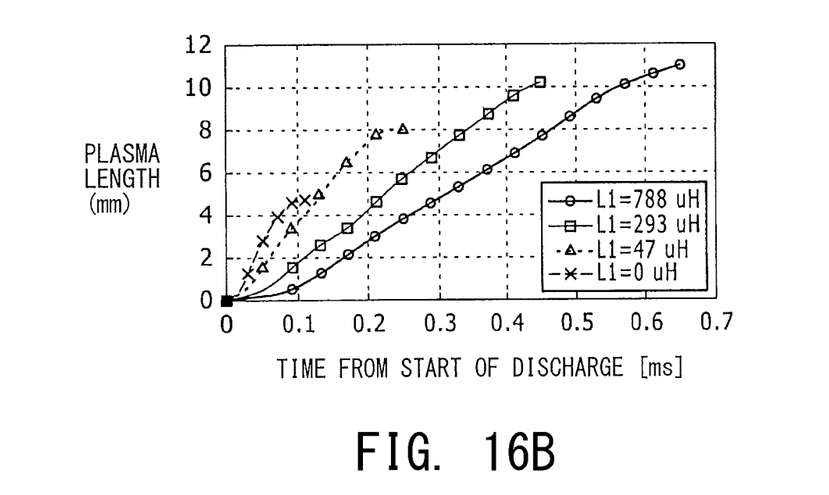
FIG. 16B is a graph showing a relationship between the time from the start of discharge (ms) and a plasma length (mm) in the rail plug shown in FIG. 14.

FIG. 16A is a graph showing a relationship between a time from start of discharge (ms) and a discharge current (A) in the rail plug 100 described above with reference to FIG. 14. FIG. 16B is a graph showing a relationship between the time from the start of discharge (ms) and a plasma length (mm) in the rail plug 100. As shown in FIG. 16A, as an inductance L1 of the conductor is increased, the discharge current is reduced and the plasma length tends to be elongated.

However, in the rail plug 100, because the magnetic field B for causing the Lorentz force F for acting on the plasma P is formed by the current flowing in the electrodes 1 and 2 themselves, a current of 50 A~200 A is required, as shown in FIG. 16A. Therefore, when the plasma P is repeatedly generated with such a large current, disadvantages may be caused such as melting of the electrodes 1 and 2. In addition, such a structure cannot be used for an application in which the plasma is generated with a relatively low current (for example, 100 mA), such as, for example, an ignition plug for an internal combustion engine for a vehicle.

An advantage of the present disclosure lies in provision of an ignition device for an internal combustion engine, which can improve ignition while reducing power consumption.

SUMMARY

According to one aspect of the present disclosure, there is provided an ignition device for an internal combustion engine, comprising: an ignition plug that is placed with a tip exposed on an end in an axial direction of a combustion chamber formed in a cylinder of the internal combustion engine, and that comprises a central electrode and a grounding electrode that are provided opposing each other at the tip; and a magnetic field former that forms a magnetic field in a direction in which a magnetic field vector passes substantially vertically through an approximate two-dimensional plane including a spark discharge path formed, by a gas flow ejected to the end in the axial direction of the combustion chamber, between the central electrode and the grounding electrode and extending in an approximate U shape in a direction orthogonal to the opposing direction of the central electrode and the grounding electrode.

According to another aspect of the present disclosure, in the ignition device for the internal combustion engine, the approximate two-dimensional plane may be a plane approximately orthogonal to the axial direction of the combustion chamber, and the magnetic field vector may be along the axial direction.

According to another aspect of the present disclosure, in the ignition device for the internal combustion engine, the magnetic field former may comprise a first magnetic element that is placed adjacent to the tip of the ignition plug and that is magnetized to one or the other polarity, and a second magnetic element that is placed on an end surface of a piston provided in the cylinder or on an outer circumferential side of the first magnetic element with a gap therebetween, and that is magnetized to a polarity opposite from that of the first magnetic element.

According to another aspect of the present disclosure, each of the first magnetic element and the second magnetic element may be a permanent magnet.

According to another aspect of the present disclosure, in the ignition device for the internal combustion engine, the magnetic field former may be configured to enable change of a direction of the magnetic field vector to one direction or an opposite direction, substantially vertical to the approximate two-dimensional plane.

According to another aspect of the present disclosure, the magnetic field former may comprise a first magnetic element that is placed adjacent to the tip of the ignition plug and that is magnetized to one or the other polarity, and a second magnetic element that is placed on an end surface of a piston provided in the cylinder or on an outer circumferential side of the first magnetic element with a gap therebetween, and that is magnetized to a polarity opposite that of the first magnetic element, and a coil may be wound around the first magnetic element, and an end of the first magnetic element on a side of the combustion chamber may be magnetized to the one or the other polarity by application of a current to the coil.

According to another aspect of the present disclosure, the application of current to the coil of the first magnetic element is desirably executed only during an ignition period by the ignition plug.

According to another aspect of the present disclosure, in the ignition device for the internal combustion engine, the first magnetic element and the second magnetic element may be magnetically connected to each other outside of the cylinder, to form a closed magnetic path.

According to another aspect of the present disclosure, in the ignition device for the internal combustion engine, a polarity of an end of the first magnetic element facing the end on the side of the combustion chamber may be switchable between the one and the other polarity by changing a direction of a current flowing in the coil.

According to another aspect of the present disclosure, in the ignition device for the internal combustion engine, the approximate two-dimensional plane may be a plane including the axial direction of the combustion chamber, and the magnetic field vector may be orthogonal to the axial direction.

According to the ignition plug for the internal combustion engine of the present disclosure, because a magnetic field former for forming a magnetic field for acting on a spark discharge path generated by the ignition plug is separately provided, the electric power consumption can be significantly reduced as compared to the rail plug described above. In addition, by the Lorentz force acting on the spark discharge path formed in an approximate U shape by the magnetic field formed by the magnetic field former, it is possible to elongate the spark discharge path. With such a configuration, the ignition in the combustion chamber can be improved.

BRIEF DESCRIPTION OF DRAWINGS

Embodiment(s) of the present disclosure will be described by reference to the following figures, wherein.

DESCRIPTION OF EMBODIMENTS

Embodiments of the present disclosure will now be described in detail with reference to the accompanying diagrams. In this description, specific shapes, materials, numerical values, directions, or the like are provided for the purpose of facilitating understanding of the present disclosure, and may be suitably changed according to the usage, the objective, the specification, or the like. Further, in the following, when a plurality of embodiments and alternative configurations are included, suitable combination of the embodiments and alterative configurations are also conceivable.

Figure 1A:
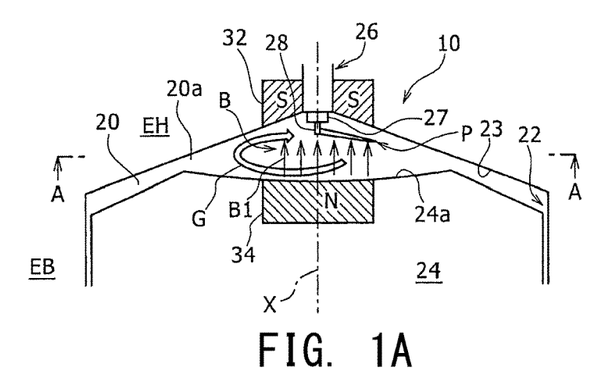
FIG. 1A is a diagram showing an ignition device for an internal combustion engine according to a first embodiment of the present disclosure.
Figure 1B:
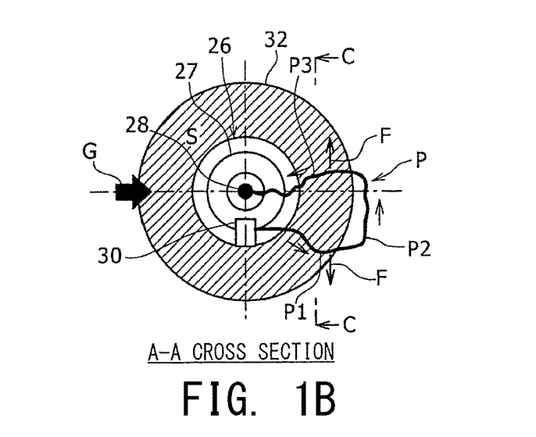
FIG. 1B is a cross-sectional diagram along a line A-A in FIG. 1A.
Figure 1C:
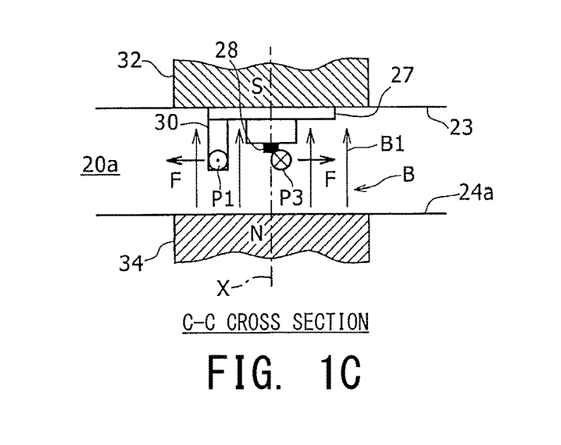
FIG. 1C is a cross-sectional diagram along a line C-C of FIG. 1B.

FIG. 1A is a diagram showing an ignition device 10 for an internal combustion engine (hereinafter, simply referred to as an "ignition device") according to a first embodiment of the present disclosure. FIG. 1B is a cross-sectional diagram along a line A-A in FIG. 1A, and FIG. 1C is a cross-sectional diagram along a line C-C in FIG. 1B.

The ignition device 10 is applied to, for example, an internal combustion engine which acquires motive force by burning fuel such as gasoline. The internal combustion engine includes a combustion chamber 20 comprising an approximately circular column-shaped space. The combustion chamber 20 is formed in a cylinder 22. The cylinder 22 is provided in a hollow shape inside an engine block EB. In the cylinder 22, a piston 24 is placed. The piston 24 is provided to be able to reciprocate along a cylinder axis direction while slidingly contacting an inner wall surface, having a circular tube shape, of the cylinder 22. In FIG. 1A, a state is shown in which the piston 24 is at a top dead center position, and a central axis X of the cylinder 22 and the piston 24 is shown with a dot-and-chain line.

In the present embodiment, an end surface 23 of the cylinder 22 is formed in a tapered surface having an approximate conical shape. The approximate conically shaped end surface 23 of the cylinder 22 is formed on an engine head EH. Between the end surface 23 of the cylinder 22 and a top surface (end surface) 24a of the piston 24 at the top dead center position, an end 20a of the combustion chamber 20 (end of the combustion chamber in the axial direction) comprising an approximate triangular conically shaped space is formed. At a center position of the end surface 23 of the cylinder 22, an ignition plug 26 is placed. The ignition plug 26 is attached in an air-tight state on the combustion chamber 20 in the cylinder 22. in addition, in the present embodiment, the ignition plug 26 is placed in a coaxial manner with the central axis X of the cylinder 22.

A tip 27 of the ignition plug 26 is placed in a state of being exposed in the end 20a of the combustion chamber 20. As shown in FIG. 1C, the ignition plug 26 has, on the tip 27 exposed in the combustion chamber end 20a, a central electrode 28 which protrudes in an axial direction at a position corresponding to the central axis X. In addition, the ignition plug 26 has a grounding electrode 30 at the tip 27. In the present embodiment, a protrusion length of the grounding electrode 30 is formed larger than that of the central electrode 28. The central electrode 28 and the grounding electrode 30 are placed in parallel to each other and opposing each other with a predetermined gap therebetween in a direction orthogonal to the axial direction (X).

In the present embodiment, an example configuration is described in which the central electrode 28 is the cathode and the grounding electrode 30 is the anode. However, the present embodiment is not limited to such a configuration, and alternatively, the electrodes may be opposite, with the central electrode 28 being the anode and the grounding electrode 30 being the cathode.

Referring back to FIG. 1A, on the end surface 23 of the cylinder 22, an intake port and an exhaust port (both of which are not shown) are provided. From the intake port, for example, a mixture gas of the fuel and air is ejected into the combustion chamber end 20a, to form a gas flow G. The gas flow G may form a swirl flow in the combustion chamber end 20a. The exhaust port has a function to exhaust waste gas generated by the combustion in the combustion chamber 20.

On the end surface 23 of the cylinder 22, a first magnetic element 32 is placed adjacent to the ignition plug 26. In addition, on the top surface 24a of the piston 24 and at a position opposing the first magnetic element 32, a second magnetic element 34 is placed. In the first embodiment, the first magnetic element 32 is formed with a permanent magnet of an S pole (one polarity) and the second magnetic element 34 is formed with a permanent magnet of an N pole (other polarity).

As shown in FIGS. 1A and 1B, the first magnetic element 32 has a circular tubular shape surrounding the periphery of the tip 27 of the ignition plug 26. On the other hand, the second magnetic element 34 has a circular column shape with approximately the same diameter as the first magnetic element 32. Desirably, the first magnetic element 32 is placed flush with the end surface 23 of the cylinder 22 forming the tapered surface, and the second magnetic element 34 is placed flush with the top surface 24a of the piston 24. By placing the magnetic elements 32 and 34 in a flushing manner as described, there is an advantage that the flow of gas ejected into the combustion chamber end 20a is not obstructed. Alternatively, the magnetic elements 32 and 34 may be provided slightly protruding toward the side of the combustion chamber end 20a, or may be embedded in the end surface 23 of the cylinder 22 and the piston 24, respectively.

With the first and second magnetic elements 32 and 34 placed in this manner, as shown in FIGS. 1A and 1C, in the combustion chamber end 20a, a magnetic field B including a magnetic field vector B1 directed from the second magnetic element 34 to the first magnetic element 32 is formed in a space between the first magnetic element 32 and the second magnetic element 34. The magnetic field vector B1 in the magnetic field B is directed in the axial direction along the central axis X.

As shown in FIGS. 1A and 1B, in the ignition device 10 of the present embodiment, when a voltage is applied to the ignition plug 26, a spark discharge path P is formed between the central electrode 28 and the grounding electrode 30. The spark discharge path P is formed, by being blown by the gas flow G ejected into the combustion chamber end 20a, in a manner to extend in an approximate U shape between the central electrode 28 and the grounding electrode 30 in a direction orthogonal to the opposing direction of the electrodes. The spark discharge path P thus formed is formed to be included in the approximate two-dimensional plane orthogonal to the axial direction.

More specifically, as shown in FIG. 1B, the spark discharge path P includes, in the order along a flow direction (counterclockwise direction) of the current shown by an arrow, a first discharge portion P1 extending from the grounding electrode 30 in a lateral direction (that is, a direction orthogonal to the axial direction), a second discharge portion P2 extending in an approximate arc shape continuous from the first discharge portion P1, and a third discharge portion P3 extending in the lateral direction (that is, a direction orthogonal to the axial direction) continuous from the second discharge portion P2 and returning to the central electrode 28. With respect to the approximate two-dimensional plane including the spark discharge path P having such a structure, the magnetic field vector B1 forming the magnetic field B is formed in a direction to pass through substantially vertically. In this manner, as shown in FIGS. 1B and 1C, a Lorentz force F directed toward the outside acts on the first discharge portion P1 and the third discharge portion P3 of the spark discharge path P, and, as a result, the spark discharge path P is elongated.

Figure 2:
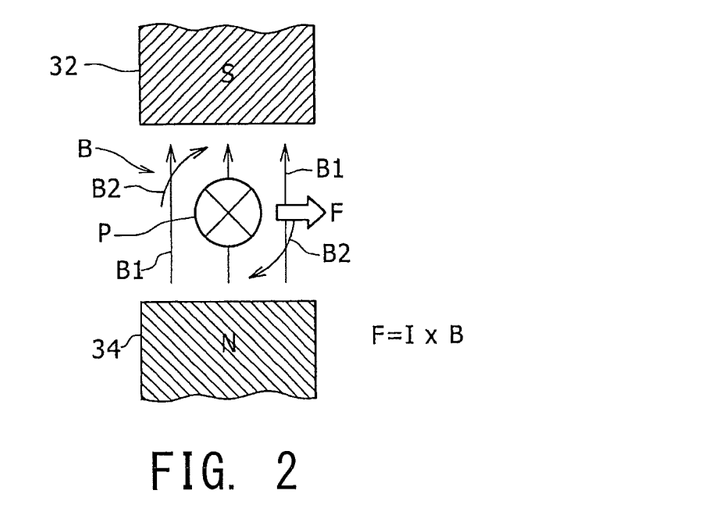
FIG. 2 is a diagram for explaining a principle of Lorentz force acting on a spark discharge path.

FIG. 2 is a diagram for explaining the principle of the Lorentz force acting on the spark discharge path P.

The magnetic field B directed from the second magnetic element 34 which is the N pole to the first magnetic element 32 which is the S pole is formed between the first and second magnetic elements 32 and 34 which are respectively made of permanent magnets, and the spark discharge path P exists in the magnetic field B. In this description, a case is considered in which, in the spark discharge path P, a current flows from the front surface side of the page toward the deeper side. The spark discharge path P is vertical to the magnetic field vector B1 forming the magnetic field B.

In this case, a current I flowing in the spark discharge path P forms a magnetic field around the spark discharge path P by the action of the current I. A direction of the magnetic field vector B2 of the magnetic field is a clockwise direction centered at the spark discharge path P. Because of this, at a left side of the spark discharge path P, the direction of the magnetic field vector B1 formed by the first and second magnetic elements 32 and 34 and the direction of the magnetic field vector B2 formed by the current I coincide, and a magnetic flux density is increased.

On the other hand, at a right side of the spark discharge path P, the direction of the magnetic field vector B1 formed by the first and second magnetic elements 32 and 34, and the direction of the magnetic field vector B2. formed by the current I are opposite from each other, and the magnetic flux density is lowered. Thus, a Lorentz force F which moves the spark discharge path P to the right side acts on the spark discharge path P. Here, the Lorentz force F per unit length acting on the spark discharge path P is a product (F=I×B) of the current I flowing in the spark discharge path P, and the magnetic field B formed by the first and second magnetic elements 32 and 34.

As a result, in the spark discharge path P of the form shown in FIG. 1A, the Lorentz force F acts in the approximate two-dimensional plane including the spark discharge path P, in a direction vertical to the axial direction X and in a mariner to pull the first discharge portion P1 and the third discharge portion P3 of the spark discharge path P elongated in an approximate U shape by the gas flow in a direction away from each other. With such an action of the Lorentz force, the extension length of the spark discharge path P is further elongated, and an area of a region surrounded by the spark discharge path P is widened. Therefore, a length where the spark discharge path P contacts the gas flow G made of, for example, the mixture gas, is extended, and ignition characteristic in the combustion chamber end 20a can be improved.

Figure 3:
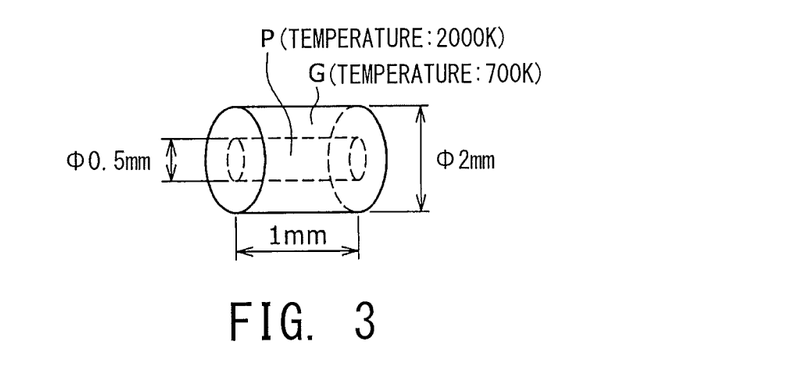
FIG. 3 is a diagram showing a model used for a test calculation of Lorentz force.

FIG. 3 is a diagram showing a model used for a test calculation of the Lorentz force. In this model, the spark discharge path P is set as a circular column structure having a diameter of 0.5 mm, a length of 1 mm, and a temperature of 2000K, the gas flow G around the spark discharge path P is set as a circular tubular structure having a diameter of 2 mm, a length of 1 mm, and a temperature of 700K, a magnetic field B in the combustion chamber end 20a is set at 1 T, and the spark discharge current (I) is set at 0.1 A. In this case, the Lorentz force F acting on the spark discharge path P can be calculated by the following Equation (1).

Magnetic Field B: $1[T]=1[Wb/m^2]=1[V·s/m^2]$

Current I: 0.1 A

Lorentz Force F (per Unit Length)=B×I=$1[T]×0.1[A]$
  $=1×0.1[V·A·s/m^2]=0.1$ $[W][s/m^2]=0.1×0.1[kgf·m/s][s/m^2]=1×10^{-2}[kgf/m]$
  $=10[kgf/mm]=100[N/mm]$      Equation (1)

A volume Vp and a mass Mp of the spark discharge path P, a volume Vg and a mass Mg of the gas flow G, and a total mass Mpg can be calculated by the following Equations (2), (3), and (4).

$Vp=0.2×10^{-9}[m^3]$, density $\rho p=1.8[kg/m^2]$,
  $Mp=0.04×10^{-9}[kg·s^2/m]$      (2)

$Vg=2.9×10^{-9}[m^3]$, density $\rho g=5.7[kg/m^3]$, $Mp=1.1×10^{-9}[kg·s^2/m]$      (3)

$Mpg=Mp+Mg=1.14×10^{-9}[kg·s^2/m]$      (4)

Thus, an acceleration a applied to the spark discharge path P, and a movement velocity v and a movement distance d of the spark discharge path P can be calculated by the following Equations (5), (6), and (7).

Acceleration $a=F/Mpg=1×10^4[m/s^2]$      (5)

Movement velocity $v=a×t=10[m/s]$      (6)

Movement distance $d=(v×t)/2=0.5×10^{-2}[mm]$      (7)

Figure 4A:
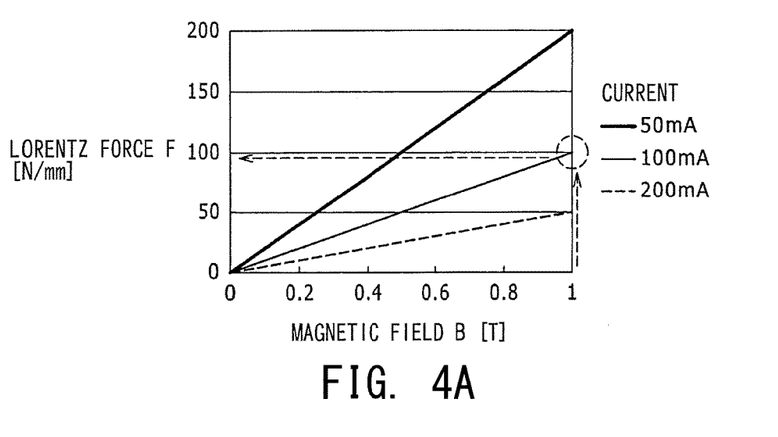
FIG. 4A is a graph showing a relationship between a magnetic field and a Lorentz force acting on a spark discharge path.
Figure 4B:
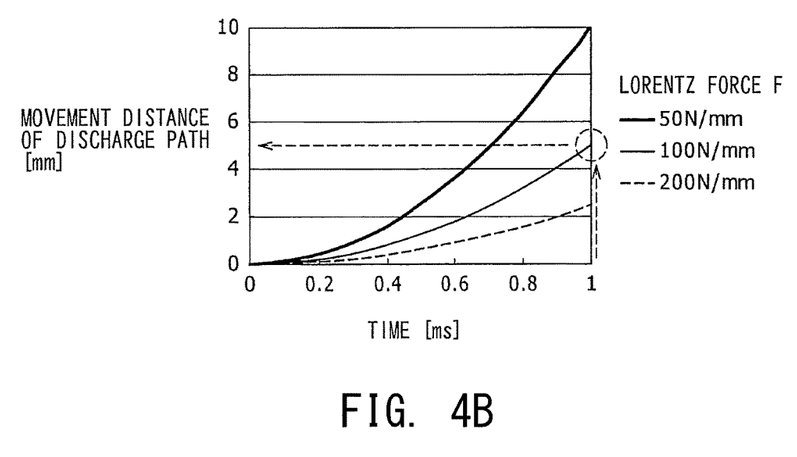
FIG. 4B is a graph showing a relationship between time and a movement distance of the spark discharge path.

Using the above-described Equations (2)~(7), the Lorentz force F when the magnetic field B and the current I change was calculated, and a graph of FIG. 4A was created. In the graph of FIG. 4A, a horizontal axis represents the magnetic field B and a vertical axis represents the Lorentz force F. Further, a movement distance d of the spark discharge path P was calculated for a case where the Lorentz force F shown in FIG. 4A acted for the period of time t, and a graph of FIG. 4B was created. In the graph of FIG. 4B, the horizontal axis represents the time t and the vertical axis represents the movement distance d.

As shown by a broken line arrow in the graph of FIG. 4A, when the magnetic field B is 1 T and the discharge current I is 100 mA, the Lorentz force F becomes 100 N/mm, and, if this state is continued for a time of 1 ms, the velocity v of the spark discharge path P is increased from 0 m/s to 10 m/s and the movement distance d is 5 mm, as shown by a broken line arrow in FIG. 4B.

As is clear from the test calculation described above, in the ignition device 10 of the present embodiment, a movement of the spark discharge path (plasma) of a similar level and with a weaker current is possible as compared to the rail plug of the related art described above with reference to FIGS. 14 to 16.

Figure 5:
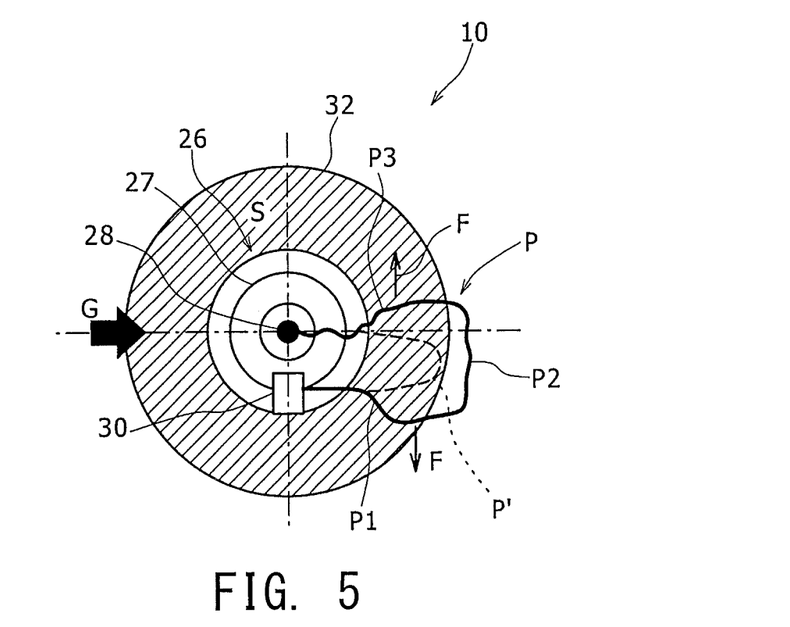
FIG. 5 is a diagram similar to FIG. 1B, and for explaining action of the ignition device for the internal combustion engine according to the first embodiment of the present disclosure.

FIG. 5 is a diagram similar to FIG. 1B, and for explaining the action of the ignition device 10 of the first embodiment. In FIG. 5, a spark discharge path P' in the case where the Lorentz force F does not act is shown in a state of a broken line. As described above, according to the ignition device 10 of the present embodiment, the spark discharge path P which is elongated in an approximate U shape by the gas flow G is pulled to both sides by the Lorentz force F so that the elongation length of the spark discharge path. P is further elongated, and an area of a region surrounded by the spark discharge path P is widened. As a result, the length of the spark discharge path P contacting the gas flow U made of, for example, the mixture gas, is extended, an initial flame in the combustion chamber end 20a is enlarged, and ignition characteristic (firing characteristic) can be improved.

In the above description, the first magnetic element 32 of the S pole is provided on the engine head EH forming the end surface 23 of the cylinder 22, and the second magnetic element 34 of the N pole is provided on the piston 24, to form the magnetic field vector B1 directed from the piston 24 to the engine head EH. The present embodiment, however, is not limited to such a configuration, and an opposite configuration may alternatively be employed, in which a magnetic element (permanent magnet) of the N pole is provided on the engine head EH, and a magnetic element (permanent magnet) of the S pole is provided on the piston 24, to thereby form the magnetic vector in an opposite direction. In this case, the current flow direction of the spark discharge path P may be set opposite from the direction described above; that is, from the central electrode 28 which is the anode to the grounding electrode 30 which is the cathode, so that the Lorentz force F acts to widen the spark discharge path P.

Figure 6:
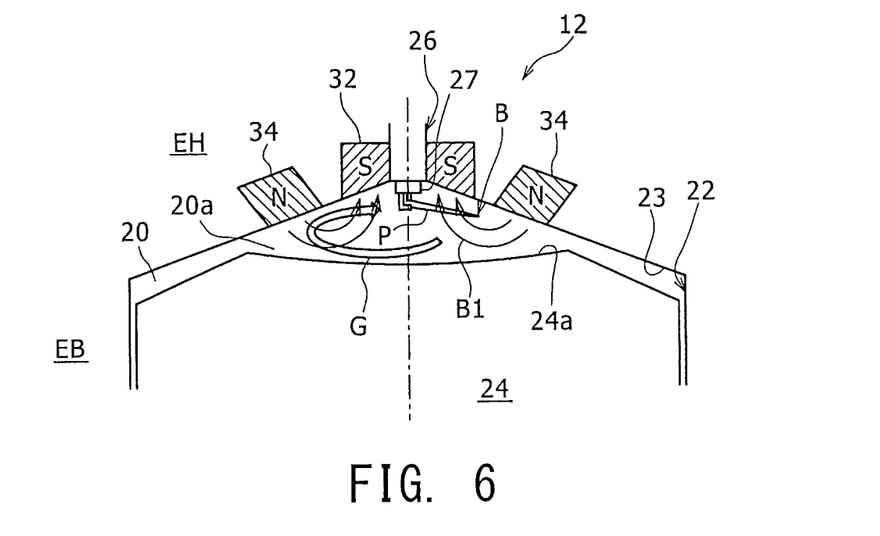
FIG. 6 is a diagram similar to FIG. 1A, and showing an ignition device for an internal combustion engine according to a second embodiment of the present disclosure.

Next, an ignition device 12 according to a second embodiment of the present disclosure will be described with reference to FIG. 6. FIG. 6 is a diagram similar to FIG. 1(a), and showing the ignition device 12. In the following description, a structure of the ignition device 12 of the present embodiment which differs from that of the ignition device 10 will primarily be described, and the same structures are referred to with the same reference numerals and will not be repeatedly described.

The ignition device 12 comprises a magnetic field former comprising the first magnetic element 32 and the second magnetic element 34. The first magnetic element 32 is provided on the engine head EH forming the end surface 23 of the cylinder 22, similar to the above-described ignition device 10. That is, the first magnetic element 32 made of the permanent magnet of the S pole and having the circular tube shape is placed in a state of being exposed in the combustion chamber end 20a at the periphery of the tip 27 of the ignition plug 26.

In the present embodiment, the second magnetic element 34 made of the N pole permanent magnet is provided not on the piston 24, but on the engine head EH. The second magnetic element 34 is placed in a state of being exposed in a circular ring shape in the combustion chamber end 20a, on an outer circumferential side of the first magnetic element 32 with a gap therefrom. Even in a case where the magnetic field former is formed in this manner, the magnetic field vector B1 formed in a curved shape directed from the second magnetic element 34 to the first magnetic element 32 approximately vertically passes the approximate two-dimensional plane including the spark discharge path P. As a result, similar to the ignition device 10 described above, in the ignition device 12 of the present embodiment also, the spark discharge path P elongated in the approximate U shape by the gas flow G is pulled to both sides by the Lorentz force F, the elongation length of the spark discharge path P is thus further elongated, and the area of the region surrounded by the spark discharge path P is widened. Therefore, the length of the spark discharge path P in contact with the gas flow G formed from, for example, the mixture gas, is extended, the initial flame in the combustion chamber end 20a is enlarged, and the ignition characteristic (firing characteristic) can be improved.

Further, according to the ignition device 12 of the present embodiment, because the second magnetic element 34 made of the permanent magnet is provided on the engine head EH, for example, the ignition device 12 can be maintained at a temperature of less than or equal to the Curie temperature by cooling the engine head EH by, for example, water cooling, and reduction of the magnetic force of the second magnetic element 34 can be suppressed.

Figure 7:
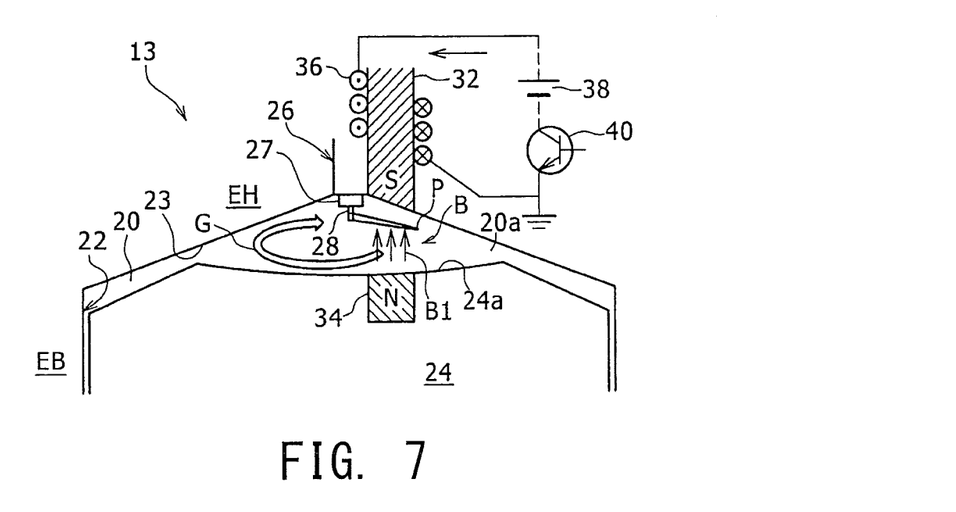
FIG. 7 is a diagram similar to FIG. 1A, and showing an ignition device for an internal combustion engine according to a third embodiment of the present disclosure.

FIG. 7 is a diagram similar to FIG. 1A, and showing an ignition device 13 according to a third embodiment of the present disclosure. In the following, a structure of the ignition device 13 of the present embodiment which differs from that of the ignition device 10 described above will primarily be described, and the same structures are referred to with the same reference numerals and will not be repeatedly described.

The ignition device 13 of the present embodiment comprises the magnetic field former including the first magnetic element 32 and the second magnetic element 34. The first magnetic element 32 is provided on the engine head EH in a state of being exposed in the combustion chamber end 20a at a position adjacent to the tip 27 of the ignition plug 26. An end, on one side, of the first magnetic element 32 is placed opposing the spark discharge path P formed in the approximate U shape in the combustion chamber end 20a. Further, a coil 36 is wound around an end, on the other side, of the first magnetic element 32 forming, for example, a rod shape. A power supply 38 and a switch 40 are connected in series to the coil 36. In the present embodiment, the first magnetic element 32 is thrilled not by the permanent magnet, but as an electromagnet formed from a ferromagnetic structure such as iron or an iron-based material, for example, and in which the one-side end is magnetized to the S pole when the switch 40 is switched ON and a current flows in the coil 36.

In the present embodiment, the second magnetic element 34 is also not formed by the permanent magnet, but by a ferromagnetic structure such as, for example, iron and an iron-based material. The second magnetic element 34 is placed on the top surface 24a of the piston 24, at a position opposing the first magnetic element 32. With such a configuration, when the first magnetic element 32 is magnetized to the S pole when the piston 24 is elevated to the position shown in FIG. 7, the second magnetic element 34 is set in a state of being magnetized to the N pole, due to polarization. With such a configuration, the magnetic field B including the magnetic field vector B1 directed from the second magnetic element 34 to the first magnetic element 32 is formed between the first magnetic element 32 and the second magnetic element 34. The magnetic field vector B1 of the magnetic field B passes substantially vertically through the approximate two-dimensional plane including the spark discharge path P formed in the approximate U shape by the gas flow G in the central electrode 28 and the grounding electrode 30 on the tip 27 of the ignition plug 26. As a result, advantages similar to those of the ignition device 10 described above can be obtained.

In addition, in the ignition device 13 of the present embodiment, the electricity application to the coil 36 may be limited to the period in which the spark discharge path P is formed by the ignition plug 26 (ignition period), in order to reduce the power consumption. This can be realized by synchronizing the time period in which the switch 40 is switched ON to the time period in which the voltage is applied to the ignition plug 26.

Further, the size of the current flowing in the coil 36 may be varied according to a load of the internal combustion engine, and a pressure, a temperature, a gas flow velocity, or the like in the cylinder 22, to vary the intensity of the induced magnetic field B. With such a configuration, it becomes possible to optimize the ignition state in the combustion chamber end 20a according to an operation state of the internal combustion engine, and a fuel consumption and power of the internal combustion engine can be improved.

In the present embodiment, an example configuration is described in which only one first magnetic element 32 is provided, which is magnetized by the electricity application to the coil. Alternatively, a plurality of the first magnetic elements may be provided on the end surface 23 of the cylinder 22. Further, for the second magnetic element 34 provided on the piston 24, there may be used a permanent magnet having a polarity opposite from the polarity to Which the first magnetic element 32 is magnetized.

Figure 8:
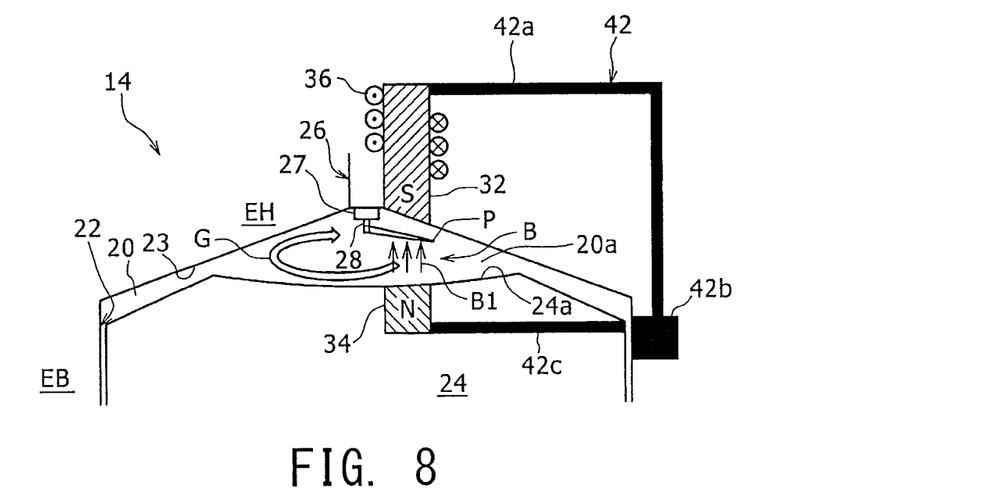
FIG. 8 is a diagram similar to FIG. 1A, and showing an ignition device for an internal combustion engine according to a fourth embodiment of the present disclosure.

Next, an ignition device 14 according to a fourth embodiment of the present disclosure will be described with reference to FIG. 8. FIG. 8 is a diagram similar to FIG. 1(a), and showing the ignition device 14 according to the fourth embodiment. In the following, a structure of the ignition device 14 of the present embodiment which differs from the structures of the ignition devices 10 and 13 of the first and third embodiments will primarily be described, and the same structures will be referred to with the same reference numerals and will not be repeatedly described.

As shown in FIG. 8, similar to the ignition device 13 of the third embodiment, in the ignition device 14, the magnetic field former is formed with the first magnetic element 32 provided on the end surface 23 of the cylinder 22, and the second magnetic element 34 provided on the piston 24. The coil 36 is wound around the first magnetic element 32. Although not shown, the coil 36 is connected in series to the power supply 38 and the switch 40. For the switch 40, for example, a transistor or the like is desirably used.

In the present embodiment, the first magnetic element 32 and the second magnetic element 34 are magnetically connected to each other by a magnetic circuit forming member 42 formed by a magnetic material, outside of the cylinder 22, to form a a closed magnetic path. More specifically, one end of a first magnetic circuit member 42a having an approximate L shape is connected to an end, of the first magnetic element 32, opposite from the combustion chamber end 20a. The other end of the first magnetic circuit forming member 42a is formed as a block-shaped magnetic element, and is placed exposed in an inner wall surface of the cylinder 22. A second magnetic circuit forming member 42c formed from a shaft-shaped magnetic element is placed on the piston 24. One end of the second magnetic circuit forming member 42c is connected to the second magnetic element 34, and the other end thereof is exposed to an outer circumferential side surface of the piston 24. In the exposed position, the other end of the second magnetic circuit forming member 42c opposes the other end 42b of the first magnetic circuit forming member 42a, with a small gap therebetween. In this manner, the first magnetic element 32 and the second magnetic element 34 are magnetically connected to each other, to form a closed magnetic path. By forming such a closed magnetic path, formation efficiency of the magnetic field B can be improved, and a strong magnetic field B can be formed in the combustion chamber end 20a with a small coil current.

Figure 9:
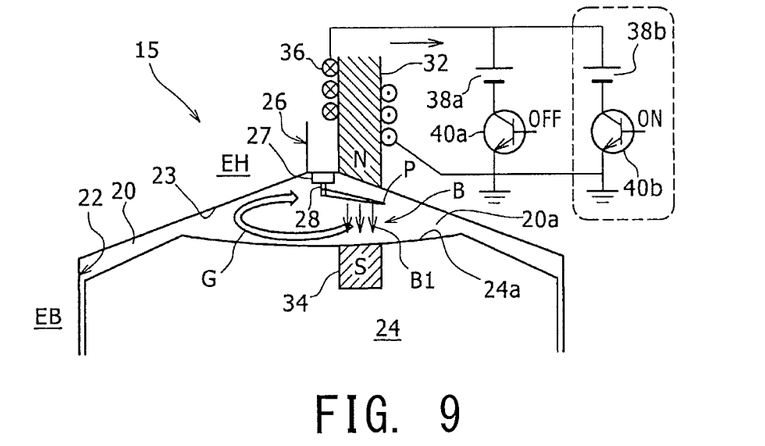
FIG. 9 is a diagram similar to FIG. 1A, and showing an ignition device for an internal combustion engine according to a fifth embodiment of the present disclosure.
Figure 10:
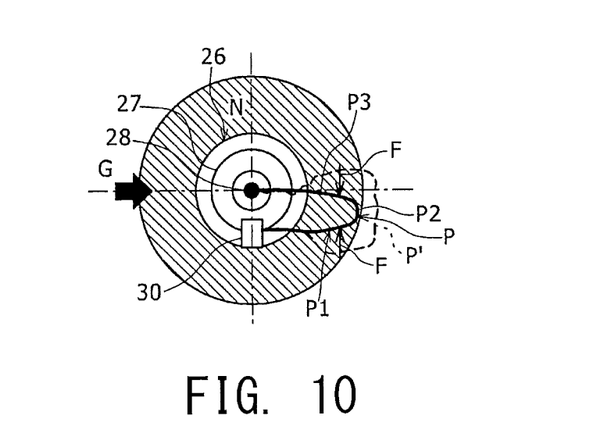
FIG. 10 is a diagram similar to FIG. 1B, and showing Lorentz force acting on a spark discharge path in the ignition device for the internal combustion engine according to the fifth embodiment of the present disclosure.

Next, an ignition device 15 of a fifth embodiment of the present disclosure will be described with reference to FIGS. 9 to 11. FIG. 9 is a diagram similar to FIG. 1A, and showing the ignition device 15. FIG. 10 is a diagram similar to FIG. 1B, and showing the Lorentz force F acting on the spark discharge path P in the ignition device 15. In the following, a structure of the ignition device 15 which differs from those of the ignition devices 10 and 13 of the first and the third embodiments will primarily be described, and the same structures will be referred to with the same reference numerals and will not be repeatedly described.

As shown in FIG. 9, the ignition device 15 comprises a magnetic field former including the first magnetic element 32 and the second magnetic element 34. Similar to the ignition device 13 of the third embodiment described above, in the first magnetic element 32, a first power supply 38a and a first switch 40a are connected in series to the wound coil 36. With such a configuration, in the ignition device 15 also, the first magnetic element 32 is magnetized by the first switch 40a being switched ON and electricity being applied to the coil 36. In this case, the end of the first magnetic element 32 facing the combustion chamber end 20a is magnetized to the S pole.

In the ignition device 15 of the present embodiment, further, a second power supply 38b and a second switch 40b are connected in series to the coil 36. The second power supply 38b and the second switch 40b are in a parallel relationship with the first power supply 38a and the first switch 40a. The second power supply 38b has an opposite direction of the positive electrode and the negative electrode compared to the first power supply 38a. With such a configuration, when the first switch 40a is switched OFF and the second switch 40b is switched ON, a current in a direction opposite from that of FIG. 7 flows in the coil 36, and, as a result, the end of the first magnetic element 32 facing the combustion chamber end 20a is magnetized to the N pole. In this case, in the second magnetic element 34 provided on the piston 24, due to the influence of a magnetic flux produced by the first magnetic element 32, an end facing the combustion chamber end 20a is magnetized to the S pole.

In a magnetic field B thus formed, the magnetic field vector B1 is formed, directed from the first magnetic element 32 to the second magnetic element 34. A magnetic field vector B1 is also formed to substantially vertically pass through the approximate two-dimensional plane including the spark discharge path P formed in the approximate U shape by the gas flow G.

When the first switch 40a is switched ON while the second switch 40b is set in the switched-OFF state, the Lorentz force F is caused by the magnetic field B to act to widen the spark discharge path P, similar to the case of the ignition device 13 of the third embodiment described above with reference to FIG. 7. In the contrary, when the second switch 40b is switched ON while the first switch 40a is set in the switched-OFF state, the direction of application of electricity to the coil 36 is reversed, the first magnetic element 32 is magnetized to the N pole, and the magnetic field B including the magnetic field vector B1 is formed, directed from the first magnetic element 32 to the second magnetic element 34. By the action of the magnetic field B, the direction of the Lorentz force F acting on the spark discharge path P is opposite from that of the ignition device 10 of the first embodiment. In other words, as shown in FIG. 10, the Lorentz force F in this case acts in a direction to suppress the elongation distance or the width of the spark discharge path P; that is, in a direction to reduce the area of the region surrounded by the spark discharge path P.

As described, in the ignition device 15 of the present embodiment, the polarity of the end of the first magnetic element 32 facing the combustion chamber end 20a can be switched to the S pole or the N pole, by changing the direction of the current flowing in the coil 36. In the ignition device 15, desirably, the ON-OFF of the first switch 40a and the second switch 40b (and the first power supply 38a and the second power supply 38b) are switched in the following manner. The ON-OFF control of the first and second switches 40a and 40b can be executed by a controller of a vehicle or the like, for example, in which the internal combustion engine is equipped. Here, in the spark discharge path P shown in FIG. 10, a length of a direction orthogonal to the axial direction is described as an "elongation distance," and a length in an axial direction is described as a "width."

In a cycle where the velocity of the gas flow G in the combustion chamber end 20a is fast (a gas flow disturbance is strong), the spark discharge path P formed in the approximate U shape is in a state where it is more likely to be elongated. Thus, the first switch 40a is switched OFF, and the second switch 40b is switched ON. With such a configuration, the Lorentz force F acts to suppress the elongation distance of the spark discharge path P. On the other hand, in a cycle in which the velocity of the gas flow G in the combustion chamber end 20a is slow (a gas flow disturbance is weak), the spark discharge path P formed in the approximate U shape is in a state where it is less likely to be elongated. Thus, the second switch 40b is switched OFF, and the first switch 40a is switched ON. With such a configuration, the Lorentz force F acts to elongate the elongation distance of the spark discharge path P. By controlling the ON and OFF states of the first and second switches 40a and 40b in this manner, it becomes possible to suppress variation in the elongation distance of the spark discharge path P among the cycles, and the growth of the initial flame becomes closer to constant. Thus, operation of the internal combustion engine can be enabled in which fluctuation of combustion (torque) is low.

The velocity of the gas flow G in each cycle can be judged by an electrical resistance value of the spark discharge path P which is elongated by the gas flow G. The electrical resistance value of the spark discharge path P can be calculated by dividing the voltage applied to the ignition plug 26 by the current flowing in the ignition plug 26.

Figure 11A:
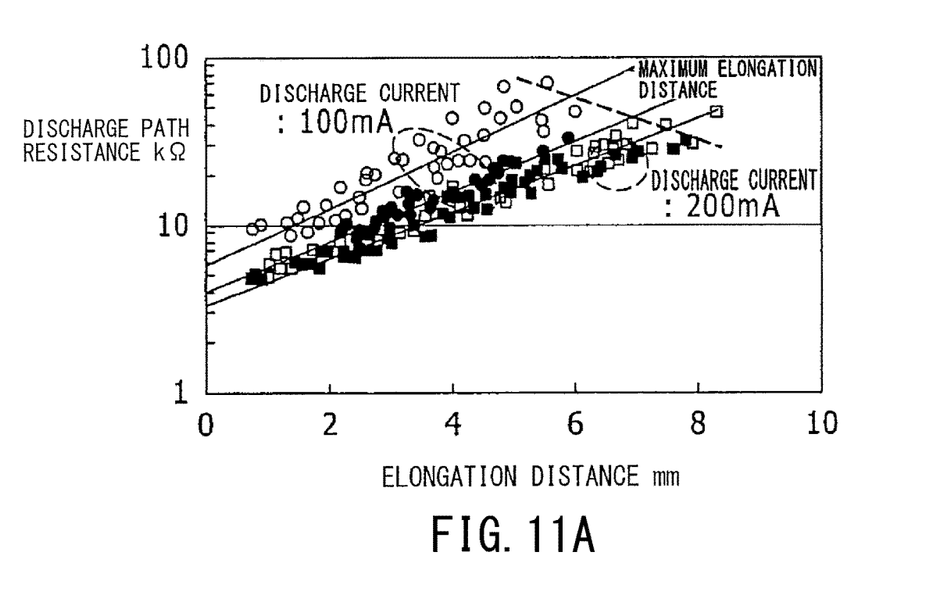
FIG. 11A is a graph showing a relationship between an elongation distance of a spark discharge path and a discharge path resistance.
Figure 11B:
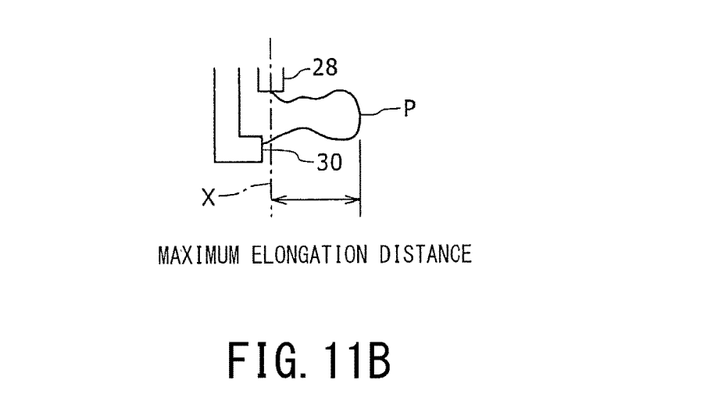
FIG. 11B is a diagram showing a maximum elongation distance of the spark discharge path.

FIG. 11A is a graph showing a relationship between the elongation distance of the spark discharge path P and the discharge path resistance, and FIG. 11B is a diagram showing a maximum elongation distance of the spark discharge path P. As shown in FIG. 11A, the electrical resistance value of the spark discharge path P is increased as the elongation distance of the spark discharge path P is increased. Therefore, a maximum elongation distance of the spark discharge path P in which the operation of the internal combustion engine is stabilized may be determined in advance by an experiment, a simulation, or the like, and stored in the controller, and a control may be employed to suppress the elongation distance of the spark discharge path P so as not to exceed the maximum elongation distance (for example, 5~8 mm). The "maximum elongation distance" refers to a length of the spark discharge path P measured from the central axis X of the ignition plug 26 (that is, the central electrode 28) in a direction orthogonal to the central axis X, as shown in FIG. 11B.

On the other hand, based on a similar idea and method, a minimum elongation distance (not shown) of the spark discharge path P may be determined and stored, and a control may be applied to extend the elongation distance of the spark discharge path P so as not to become lower than the minimum elongation distance.

By controlling the elongation distance of the spark discharge path P in a predetermined range in this manner, the growth of the initial flame can be stabilized, and an operation of the internal combustion engine having a small torque fluctuation can be realized.

In the ignition device 15 of the fifth embodiment, a configuration is employed in which the direction of the magnetic field vector B1 is changed by switching the direction of flow of the current in the coil 36, but the structure is not limited to such a structure. Alternatively, a configuration may be employed in which the direction of the magnetic field vector B1 of the magnetic field B between the first and second magnetic elements 32 and 34 is not changed, and the direction of the current flowing in the spark discharge path P is switched. With such a configuration also, similar control for the elongation distance of the spark discharge path P can be executed.

Figure 12:
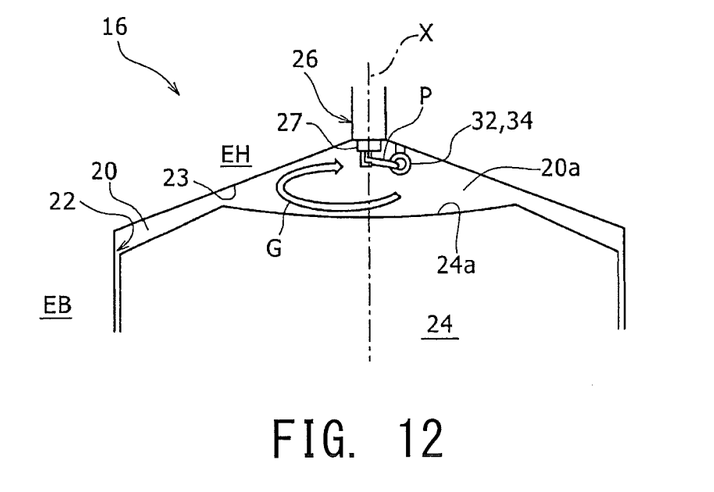
FIG. 12 is a diagram similar to FIG. 1A, and showing an ignition device for an internal combustion engine according to a sixth embodiment of the present disclosure.
Figure 13:
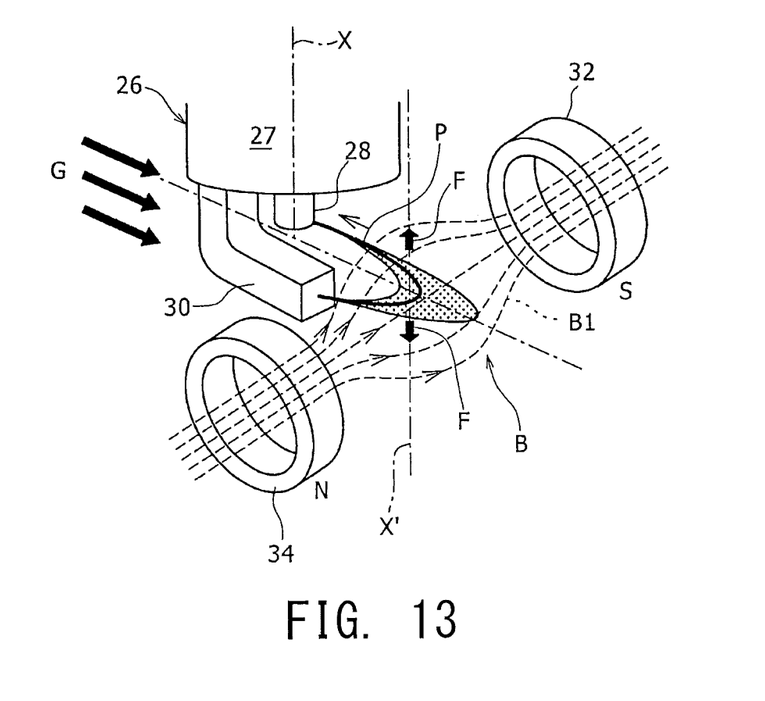
FIG. 13 is a perspective diagram showing in an enlarged manner important parts of the ignition device for the internal combustion engine shown in FIG. 12.

FIG. 12 is a diagram similar to FIG. 1A, and showing an ignition device 16 according to a sixth embodiment of the present disclosure. FIG. 13 is a perspective diagram enlarging important parts of the ignition device 16 shown in FIG. 12. In the following, a structure of the ignition device 16 of the present embodiment which differs from that of the ignition device 10 of the first embodiment will primarily be described, and the same structures will be referred to by the same reference numerals and will not be repeatedly described.

As shown in FIG. 12, in the ignition device 16 of the present embodiment, the first magnetic element 32 and the second magnetic element 34 of the magnetic field former are placed in a state of being protruded from the end surface 23 of the cylinder 22 into the combustion chamber end 20a. In this case, as shown in FIG. 13, the first magnetic element 32 is formed from a permanent magnet forming the S pole and the second magnetic element 34 is formed from a permanent magnet forming the N pole. The first magnetic element 32 and the second magnetic element 34 are respectively formed in a ring shape, and are placed to oppose each other with a predetermined gap therebetween. With such a configuration, a magnetic field B including a magnetic field vector B1 formed directed from the second magnetic element 34 to the first magnetic element 32 is formed between the first magnetic element 32 and the second magnetic element 34. The magnetic field vector B1 is formed to substantially vertically pass through a two-dimensional plane including the central axis X of the ignition plug 26 and a straight line X' parallel to the central axis X.

In addition, in the ignition plug 26 of the present embodiment, the grounding electrode 30 forms an approximate L shape and extends to a positon lower than the central electrode 28 at the tip 27, so that the central electrode 28 and the grounding electrode 30 oppose each other in the axial direction X. Therefore, in this case, the spark discharge path P formed by elongating in the approximate U shape by the gas flow G between the central electrode 28 and the grounding electrode 30 is included in the approximate two-dimensional plane extending in a downstream side of the gas flow G, and the magnetic field B is formed such that the magnetic field vector B1 substantially vertically passes through (or crosses) the approximate two-dimensional plane.

With the ignition device 16 of the present embodiment also, advantages similar to those of the ignition device 10 of the first embodiment can be obtained. Specifically, the spark discharge path P elongated in the approximate U shape by the gas flow U is pulled to both sides in the axial direction by the Lorentz force F so that the elongation length in the axial direction of the spark discharge path P is further elongated, and the area of the region surrounded by the spark discharge path P is widened. Therefore, the length of the spark discharge path P in contact with the gas flow G formed from, for example, the mixture gas, is extended, the initial flame in the combustion chamber end 20a is enlarged, and the ignition characteristic (firing characteristic) can be improved.

The present disclosure is not limited to the above-described embodiments and alternative configurations thereof, and various modifications and improvements are possible within the items described in the claims of the present disclosure and within an equivalent range thereof.

The invention claimed is:

1. An ignition device for an internal combustion engine, comprising:
   an ignition plug that is placed with a tip exposed on an end in an axial direction of a combustion chamber formed in a cylinder of the internal combustion engine, and that comprises a central electrode and a grounding electrode that are provided opposing each other at the tip; and
   a magnetic field former that forms a magnetic field in a direction in which a magnetic field vector substantially vertically passes through an approximate two-dimensional plane including a spark discharge path formed, by a gas flow ejected to the end in the axial direction of the combustion chamber, between the central electrode and the grounding electrode and extending in an approximate U shape in a direction orthogonal to the opposing direction of the central electrode and the grounding electrode.

2. The ignition device for the internal combustion engine according to claim 1, wherein
the approximate two-dimensional plane is a plane approximately orthogonal to the axial direction of the combustion chamber, and the magnetic field vector is along the axial direction.

3. The ignition device for the internal combustion engine according to claim 1, wherein
the magnetic field former comprises a first magnetic element that is placed adjacent to the tip of the ignition plug and that is magnetized to one or the other polarity, and a second magnetic element that is placed on an end surface of a piston provided in the cylinder or on an outer circumferential side of the first magnetic element with a gap therebetween, and that is magnetized to a polarity opposite from that of the first magnetic element.

4. The ignition device for the internal combustion engine according to claim 2, wherein
the magnetic field former comprises a first magnetic element that is placed adjacent to the tip of the ignition plug and that is magnetized to one or the other polarity, and a second magnetic element that is placed on an end surface of a piston provided in the cylinder or on an outer circumferential side of the first magnetic element with a gap therebetween, and that is magnetized to a polarity opposite from that of the first magnetic element.

5. The ignition device for the internal combustion engine according to claim 3, wherein
each of the first magnetic element and the second magnetic element is a permanent magnet.

6. The ignition device for the internal combustion engine according to claim 4, wherein
each of the first magnetic element and the second magnetic element is a permanent magnet.

7. The ignition device for the internal combustion engine according to claim 1, wherein
the magnetic field former is configured to enable change of a direction of the magnetic field vector to one direction or an opposite direction, substantially vertical to the approximate two-dimensional plane.

8. The ignition device for the internal combustion engine according to claim 7, wherein
the magnetic field former comprises a first magnetic element that is placed adjacent to the tip of the ignition plug and that is magnetized to one or the other polarity, and a second magnetic element that is placed on an end surface of a piston provided in the cylinder or on an outer circumferential side of the first magnetic element with a gap therebetween, and that is magnetized to a polarity opposite from that of the first magnetic element, and a coil is wound around the first magnetic element, and an end of the first magnetic element on a side of the combustion chamber is magnetized to the one or the other polarity by application of a current to the coil.

9. The ignition device for the internal combustion engine according to claim 8, wherein
the application of current to the coil of the first magnetic element is executed only during an ignition period by the ignition plug.

10. The ignition device for the internal combustion engine according to claim 8, wherein
the first magnetic element and the second magnetic element are magnetically connected to each other outside of the cylinder, to form a closed magnetic path.

11. The ignition device for the internal combustion engine according to claim 9, wherein
the first magnetic element and the second magnetic element are magnetically connected to each other outside of the cylinder, to form a closed magnetic path.

12. The ignition device for the internal combustion engine according to claim 8, wherein
a polarity of an end of the first magnetic element facing the end on the side of the combustion chamber is switchable between the one or the other polarity by changing a direction of a current flowing in the coil.

13. The ignition device for the internal combustion engine according to claim 9, wherein
a polarity of an end of the first magnetic element facing the end on the side of the combustion chamber is switchable between the one or the other polarity by changing a direction of a current flowing in the coil.

14. The ignition device for the internal combustion engine according to claim 10, wherein
a polarity of an end of the first magnetic element facing the end on the side of the combustion chamber is switchable between the one or the other polarity by changing a direction of a current flowing in the coil.

15. The ignition device for the internal combustion engine according to claim 11, wherein
a polarity of an end of the first magnetic element facing the end on the side of the combustion chamber is switchable between the one or the other polarity by changing a direction of a current flowing in the coil.

16. The ignition device for the internal combustion engine according to claim 1, wherein
the approximate two-dimensional plane is a plane including the axial direction of the combustion chamber, and the magnetic field vector is orthogonal to the axial direction.

* * * * *